(12) United States Patent
Johnston et al.

(10) Patent No.: US 8,843,591 B2
(45) Date of Patent: Sep. 23, 2014

(54) SELECTABLE REPAINTING OF UPDATABLE NETWORK DISTRIBUTABLE IMAGERY

(75) Inventors: James S. Johnston, Lexington, KY (US); Raymond R. Hornback, Jr., Lexington, KY (US); William M. Quinn, Lexington, KY (US); Kevin Solie, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 1655 days.

(21) Appl. No.: 11/082,456

(22) Filed: Mar. 17, 2005

(65) Prior Publication Data

US 2006/0212396 A1 Sep. 21, 2006

(51) Int. Cl.
*G06F 15/16* (2006.01)
*G06F 15/173* (2006.01)
*G06Q 10/10* (2012.01)

(52) U.S. Cl.
CPC .................................. *G06Q 10/10* (2013.01)
USPC ........................................ 709/219; 709/223

(58) Field of Classification Search
USPC ........... 709/217–219, 223–229; 715/733–747
See application file for complete search history.

(56) References Cited

U.S. PATENT DOCUMENTS

| 6,072,498 | A | 6/2000 | Brittain et al. |
| 6,091,422 | A | 7/2000 | Ouaknine et al. |
| 6,311,193 | B1 * | 10/2001 | Sekido ................................. 1/1 |
| 7,516,204 | B2 * | 4/2009 | Kobayashi et al. ........... 709/223 |
| 2002/0091848 | A1 * | 7/2002 | Agresta et al. ................. 709/231 |
| 2002/0143800 | A1 * | 10/2002 | Lindberg et al. .............. 707/201 |
| 2002/0146122 | A1 * | 10/2002 | Vestergaard et al. ......... 380/231 |
| 2003/0023953 | A1 * | 1/2003 | Lucassen et al. ............. 717/106 |
| 2003/0093267 | A1 * | 5/2003 | Leichtling et al. ............ 704/215 |
| 2003/0177175 | A1 * | 9/2003 | Worley et al. ................. 709/203 |

FOREIGN PATENT DOCUMENTS

| CA | 2347343 A1 | 11/2001 |
| JP | 2003303092 A | 10/2003 |

* cited by examiner

*Primary Examiner* — Jeong S Park
(74) *Attorney, Agent, or Firm* — Steven M. Greenberg, Esq.; CRGO Law

(57) ABSTRACT

A method, system and apparatus for the selectable repainting of updatable network distributable imagery. A method for selectably repainting updatable network distributable content can include establishing a repainting selection selected from the group consisting of continuous repainting and delayed repainting. The method further can include rendering a complete view of the updatable network distributable content. The method yet further can include receiving portions of an image update to the complete view. Finally, the method can include repainting the complete view as the portions are received if the repainting selection indicates continuous repainting, and otherwise delaying a repainting of the complete view until a threshold portion of the portions have been received.

5 Claims, 2 Drawing Sheets ies
SELECTABLE REPAINTING OF UPDATABLE NETWORK DISTRIBUTABLE IMAGERY

BACKGROUND OF THE INVENTION

1. Statement of the Technical Field

The present invention relates to the field of network distributable imagery and more particularly to the rendering of network distributable imagery in a client-side viewer.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver text, graphics, audio, video and data over the single data communications medium of the Internet. These technologies include Web browsing, application sharing, instant messaging, and Web conferencing.

In its most basic form, Web browsing involves the processing of content requests for content disposed in content servers about the Internet. Responsive to the content requests, the requested content can be forwarded to the requesting client viewers. The client viewers, in turn, can render the content for viewing by the end user. Notably, the content which is rendered in the viewer can include a mix of text, data, audio, video and graphics. Generally, the text and data portion of the content can be rendered quite quickly, while the audio, video and graphics portions of the content can require more time to download and render.

In conventional application sharing, an application host can distribute imagery of an application operating in the host to one or more application viewers distributed about the computer communications network. The imagery can include not only the screens rendered in association with the operation of the shared application, but also the visual presentation of mouse pointer movements and the like. Generally, speaking, however, the imagery can include only discrete "snap-shots" of the actual display of the operating application in the host system. In this way, the application viewers can be given the appearance of sharing an application, though each viewer merely views a shadow rendering of only a portion of the operation of the shared application.

In both the case of Web browsing and the case of application sharing, different portions of an image can be rendered at different times during the course of downloading the entirety of the image from a network source of the image. Advantageously, by viewing faster loading portions of the image before viewing slower loading portions of the image, the end user can track the progress of downloading the image. Yet, the partial display of an image can be quite distracting for many. Specifically, as new portions of the image are received and rendered, the process of rendering newly received portions of the image can cause a resizing of the image. To the extent that the end user had been viewing an already rendered portion of the image prior to the resizing, the resizing operation can displace the already rendered portion. Consequently, the displacement can be irritating to the end user.

SUMMARY OF THE INVENTION

The present invention addresses the deficiencies of the art in respect to image rendering and provides a novel and non-obvious method, system and apparatus for the selectable repainting of updatable network distributable imagery. A method for selectably repainting updatable network distributable content can include establishing a repainting selection selected from the group consisting of continuous repainting and delayed repainting. The method further can include rendering a complete view of the updatable network distributable content. The method yet further can include receiving portions of an image update to the complete view. Finally, the method can include repainting the complete view as the portions are received if the repainting selection indicates continuous repainting, and otherwise delaying a repainting of the complete view until a threshold portion of the portions have been received.

Notably, the method of the invention can be applied to the venerable model-view-controller (MVC) architecture. In this regard, a method for selectably repainting a view in an MVC architecture can include rendering a view for an underlying model, receiving updates to the underlying model, and suppressing an updating of the view until a threshold level of updates have been received for application to the underlying model. For instance, the receiving step can include buffering updates to the underlying model until a threshold portion of a complete change to the underlying model has been received, and applying the buffered updates to the underlying model only when the threshold portion of the complete change to the underlying model has been received.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for selectably repainting updatable network distributable imagery such as a Web page or application imagery produced in an application sharing session. In accordance with the present invention, a viewer for rendering updatable network distributable imagery can be selectably configured to delay repainting network distributable imagery until a threshold portion of an update to the network distributable imagery has been received for rendering in the viewer.

In particular, the viewer can be configured to delay repainting network distributable imagery until the entirety of an update to the network distributable imagery has been received. Alternatively, the viewer can be configured to repaint network distributable imagery as portions of the update to the network distributable imagery are received for rendering in the viewer. In either case, the end user can select a suitable mode so as to avoid unwanted displacement of content during a dynamic repainting operation where desired.

Figure 1:
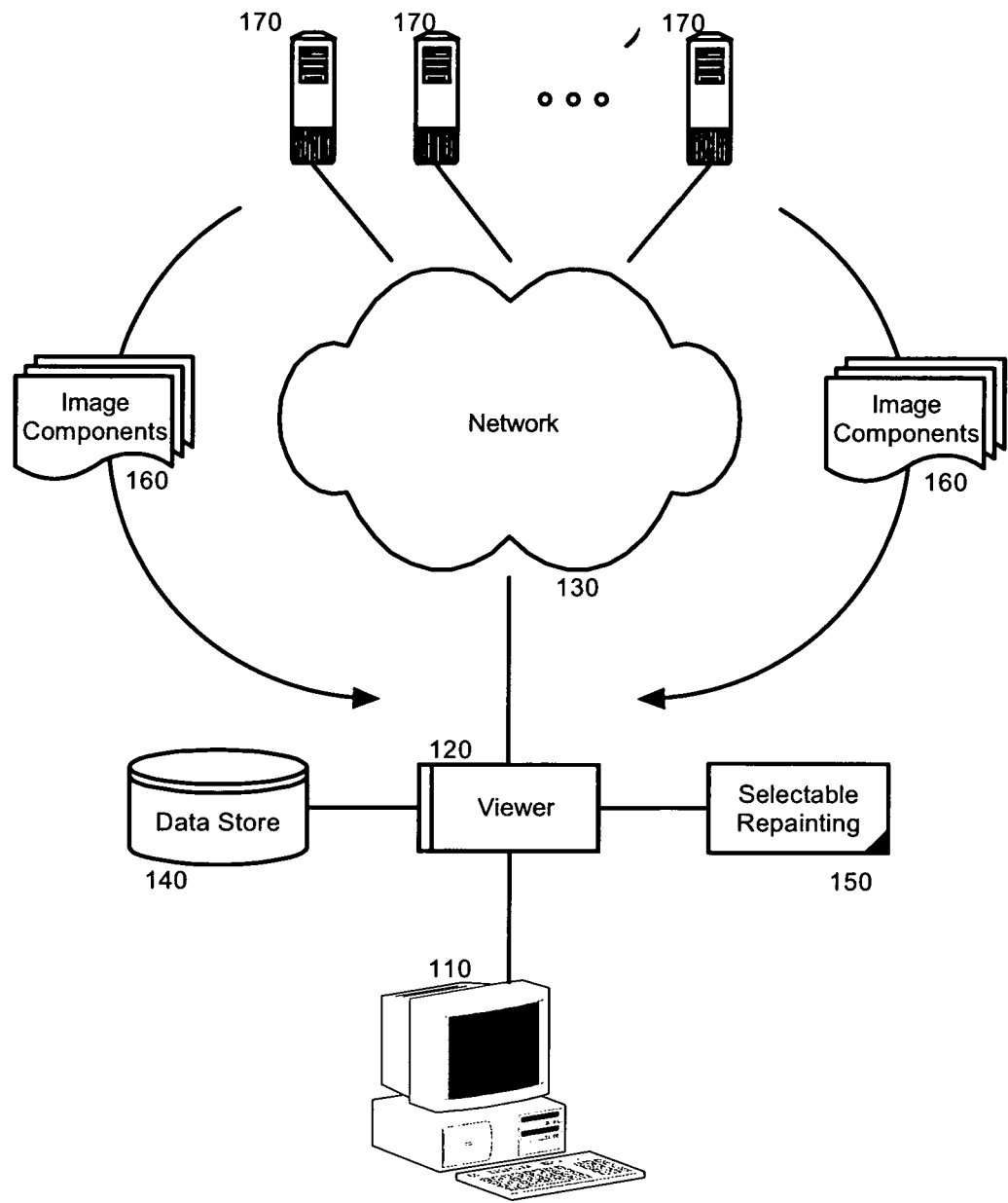
FIG. 1 is a schematic illustration of an image rendering system configured for selectable repainting of updatable network distributable imagery; and, FIG. 2 is a flow chart illustrating a process for selectably repainting updatable network distributable imagery.

In further illustration, FIG. 1 is a schematic illustration of an image rendering system configured for selectable repainting of updatable network distributable imagery. As shown in FIG. 1, a viewer 120 can be disposed in a computing client 110 and coupled to one or more image sources 170 over a computer communications network 130 such as the global Internet. The images sources 170 can include content stores able to serve updatable imagery to clients such as the computing client 110 which are positioned about the network 130. Examples include an application sharing host able to distributed discrete snap-shots of the actual display of the operating application in a host system. Examples further can include a Web server programmed to serve different Web pages as requested by clients such as the computing client 110.

In accordance with the present invention, the viewer 120 can be coupled to a data store configured to store image components 160 of a distributed image and selectable repainting logic 150 programmed to selectably repaint a view of the distributed image when a threshold portion of the image components 160 have been received for rendering in the viewer 120. Specifically, the selectable repainting logic 150 can be configured by an end user either to repaint the distributed image as the image components 160 have been received in order to gauge the real-time progress of receiving the image components 160. Conversely, the selectable repainting logic 150 can be configured by the end user to repaint the distributed image when a threshold amount of the image components 160 have been received for rendering in the viewer 120. Preferably, the threshold amount can be the entirety of the image components 160 which when combined form the image.

Figure 2:
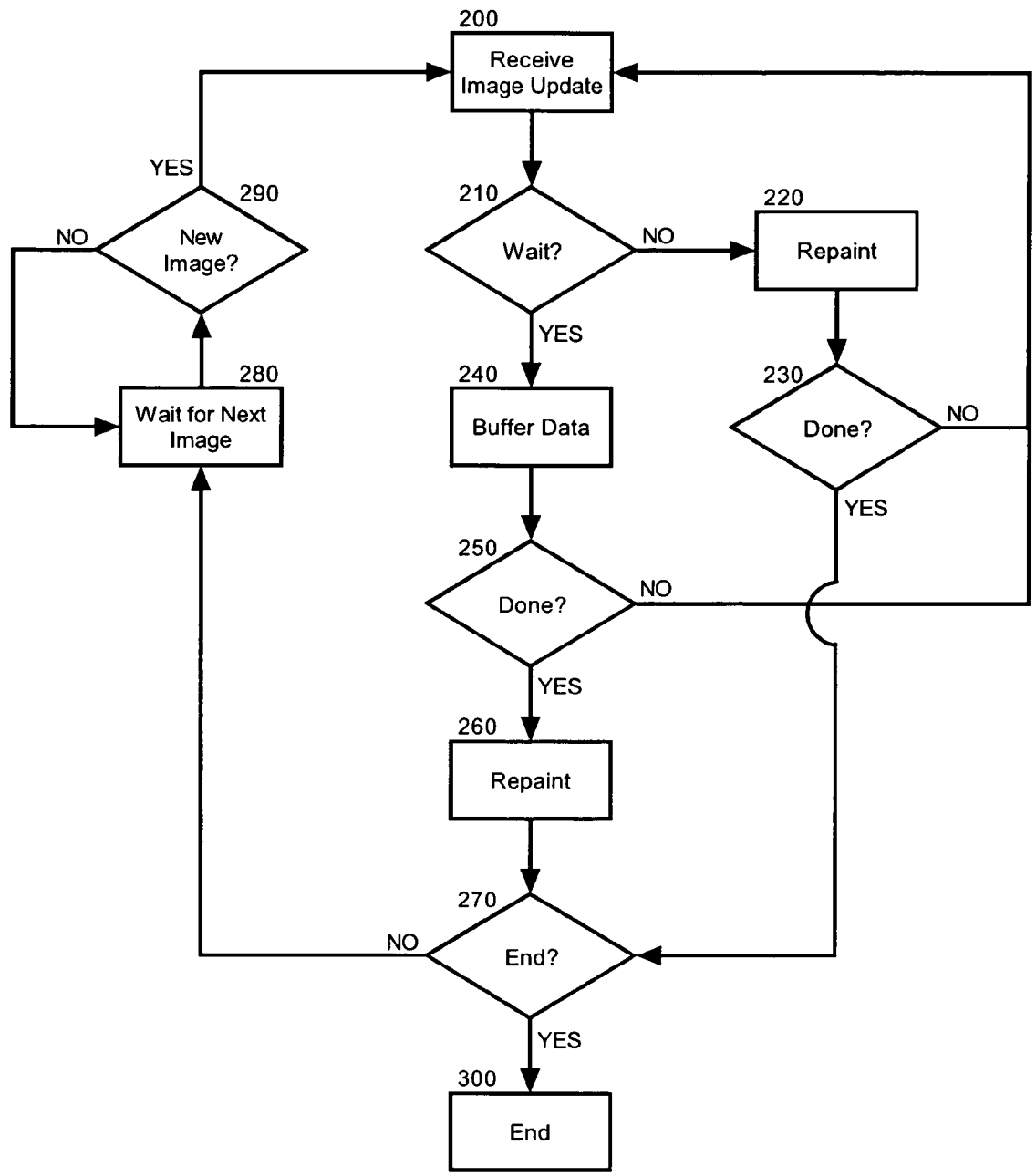

In further illustration, FIG. 2 is a flow chart illustrating a process for selectably repainting updatable network distributable imagery. Beginning in block 200, an image update can be received in the form of an image component or other portion of the image, such as a textual portion, a graphical portion, an audio portion, or a video portion, to name a few. In decision block 210, it can be determined whether continuous repainting has been selected, or whether delayed repainting has been selected. If continuous repainting has been selected, in block 220 the view of the image can be repainted and, if in decision block 230 it is determined that the entirety of the image has not yet been received, the process can return to block 200.

Otherwise, in decision block 210 if it is determined that delayed repainting has been selected, in block 240 the received image components can be buffered and in block 250 it can be determined whether a threshold amount of the image (such as the entirety of the image) has been received. If not, the process can return to block 200 in which additional image components can be received. By comparison, if the threshold amount of the image (such as the entirety of the image) has been received, in block 260 the view of the image can be repainted. In either case, in decision block 270 if the operation of the viewer is to end, in block 300 the process can end. Otherwise, in blocks 280 and 290 the viewer can await the receipt of a new set of image components forming an image.

Notably, the present invention can be viewed architecturally in terms of the MVC pattern. In the MVC paradigm, the system of the present invention can be pre-configured to repaint the view either responsive to an incremental change in the model, or only responsive to a completed change to the model. In the latter circumstance, changes to the model can be applied incremetally as in the traditional circumstance. However, a change in the view can be suppressed until a threshold number of changes have been applied to the model. Alternatively, the system of the invention can determine starting and ending points to an update to the model. For delayed repainting, the repainting of the view only can occur when the ending point to the model update has been determined. Until the ending point has been encountered, the changes to the model can be buffered and not applied to the underlying model until all of the changes have been received. In this way, the view need only monitor the underlying model and repaint responsive to a change in the underlying model.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for selectably repainting updatable network distributable content, the method comprising the steps of:
  establishing a repainting selection of continuous repainting or delayed repainting;
  receiving in a computing client from an operating application in a host system from over a computer communications network, a discrete snap-shot of an actual display of the operating application in the host system;
  rendering in a viewer disposed in the computing client, the discrete snap-shot;
  receiving in the computing client from the host system portions of an image update to said discrete snap-shot of the actual display of the operating application; and,
  repainting said snap-shot in said viewer as said portions are received if said repainting selection indicates continuous repainting, but otherwise delaying a repainting of said snap-shot until a threshold level of said portions have been received.

2. The method of claim 1, wherein said repainting step comprises the step of repainting said snap-shot in said viewer as said portions are received if said repainting selection indicates continuous repainting, and otherwise delaying a repainting of said snap-shot in said viewer until all of said portions have been received.

3. The method of claim 1, wherein the snap-shot is imagery of a shared application.

4. The method of claim 1, wherein the snap-shot is a Web page.

5. The method of claim 1, wherein said portions of said image update comprise image elements selected from the group consisting of text, graphics, audio and video.

* * * * *